United States Patent [19]

Riddel

[11] 4,142,612
[45] Mar. 6, 1979

[54] SERVO MOTOR WITH DIFFERENTIAL PRESSURE CONTROLLED AND ACTUATED RELEASE VALVE

[75] Inventor: John W. Riddel, Fenton, Mich.

[73] Assignee: General Motors Corporation, Detroit, Mich.

[21] Appl. No.: 835,239

[22] Filed: Sep. 21, 1977

[51] Int. Cl.² ............................................. B60K 15/00
[52] U.S. Cl. ........................................ 192/3 G; 91/47; 91/461; 180/108; 123/103 R
[58] Field of Search ........................ 192/3 G; 180/108; 91/47, 461

[56] References Cited

U.S. PATENT DOCUMENTS

| 3,388,765 | 6/1968 | Sheppard | 192/3 G |
| 3,960,123 | 6/1976 | Berninger | 180/108 |
| 3,999,622 | 12/1976 | Reed | 123/103 R |
| 4,082,158 | 4/1978 | Carol et al. | 123/103 R X |

Primary Examiner—Benjamin W. Wyche
Attorney, Agent, or Firm—D. D. McGraw

[57] ABSTRACT

A vacuum operated road speed control system release valve with vacuum in the release chamber exerting a closing force on the valve. When the release circuit is opened to atmosphere by brake actuation, vacuum is lost in the release chamber and the valve is opened by the higher pressure in the control system. The open valve then connects the higher pressure side of the servomotor of the control system to vacuum to provide a powered release.

2 Claims, 1 Drawing Figure

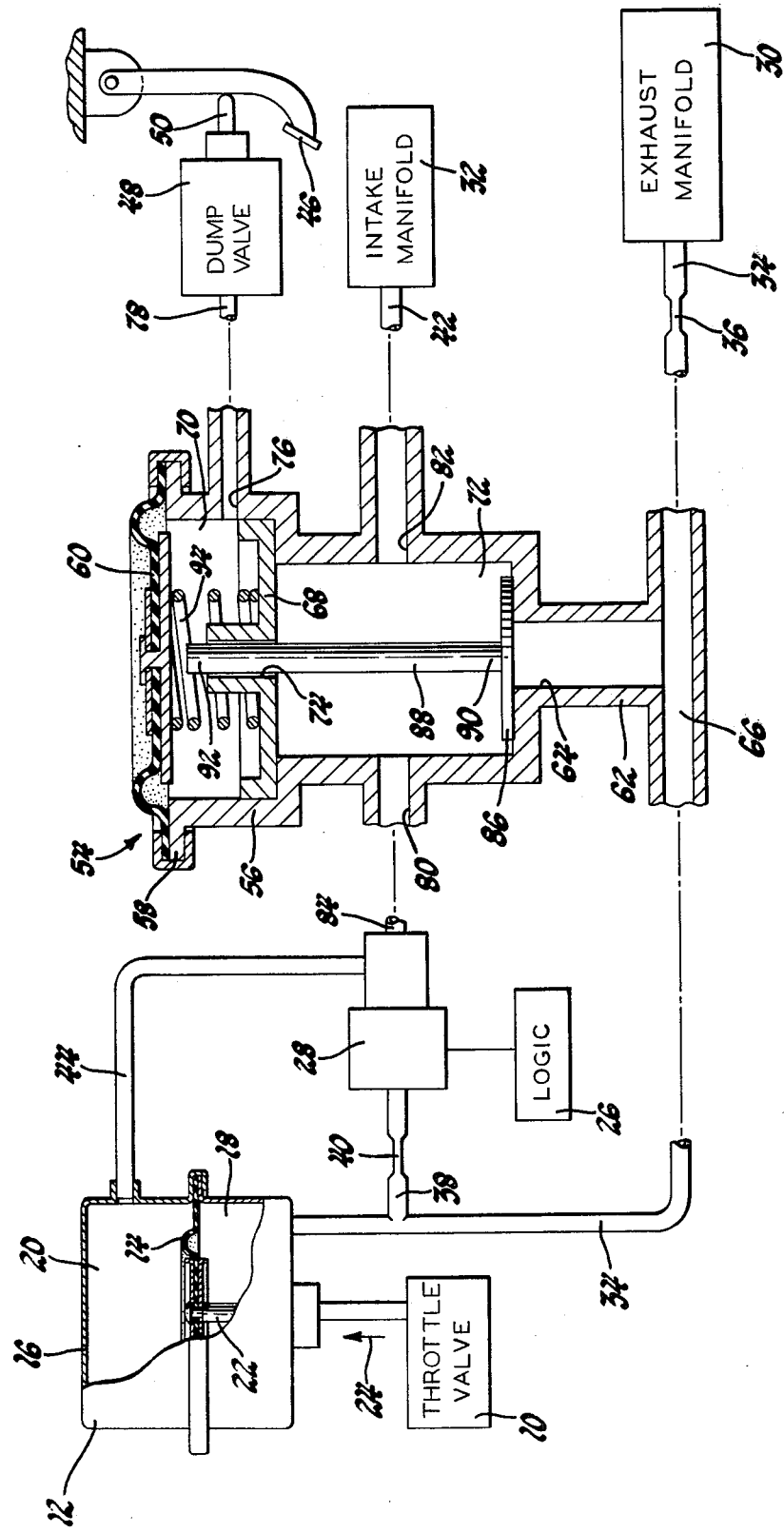

SERVO MOTOR WITH DIFFERENTIAL PRESSURE CONTROLLED AND ACTUATED RELEASE VALVE

The invention relates to a pressure controlled and actuated release valve which is particularly useful in a vehicle road speed control system. The release valve is vacuum operated to maintain the cruise control system in an operable condition wherein differential pressures are available to the cruise control servomotor under control of a logic and control valve arrangement. When the vehicle brakes are actuated, a brake pedal controlled dump valve opens to dump vacuum from the release valve and the release valve opens to cause the high pressure side of the cruise control servomotor to be evacuated. Since the variable pressure or control side of the servomotor is at a lesser vacuum, a powered release operation of the servomotor is attained. The release valve amplifies the force which can be generated by the supply vacuum so that the valve is kept closed against a much greater pressure than would otherwise be the case. Since the fluid pressure acting on the valve is in a direction to release the cruise control system, any malfunctions in the system will cause the release valve to open to inactivate the system. By providing a release chamber which is allowed to increase at absolute pressure at a limited rate to actuate the release valve, a momentary pulse of pressure in the vacuum circuit, as can occur with intake manifold vacuum changes, will not be sufficient to cause actuation of the release valve.

IN THE DRAWING

The FIGURE is a schematic representation of a vehicle road speed control system containing a release valve assembly embodying the invention, with parts broken away and in section.

The system in the drawing is arranged to control a throttle valve 10 of a vehicle engine to maintain a desired vehicle road speed. A servomotor 12 has a power wall 14 dividing the servomotor housing 16 into a high pressure chamber 18 and a variable low pressure chamber 20. An output member 22 is connected to power wall 14 and is operatively connected to throttle valve 10 to move the throttle valve. Arrow 24 indicates the direction of movement of output member 22 to open the throttle valve 10.

The system includes a control logic 26 of any suitable type well-known in the art. Logic 26 is commonly arranged to receive a signal representing actual vehicle road speed and a signal representing desired vehicle road speed. When the system is actuated, logic 26 generates an output signal which is delivered to control valve 28. Valve 28 controls the differential pressure imposed across power wall 14 to control throttle valve 10 and maintain the actual vehicle speed at or very close to the desired vehicle speed as road load conditions change. The particular system disclosed uses the engine exhaust manifold 30 as a high pressure source and the engine intake manifold 32 as a low pressure source. A conduit 34 from the exhaust manifold 30 leads through a suitable restriction 36 to the high pressure chamber 18 of servomotor 12. A branch conduit 38 has a suitable restriction 40 providing high pressure from exhaust manifold 30 to control valve 28. A conduit 42 operatively connects the intake manifold 32 to provide low pressure to control valve 28. Conduit 44 provides a control pressure to the variable pressure chamber 20 of servomotor 12 from control valve 28. This pressure is variable and is usually intermediate the high pressure in chamber 18 and the low pressure of manifold 32. The vehicle brake pedal 46 is arranged to keep the dump valve 48 closed when the brake pedal is in the brake release position by engaging spring loaded plunger 50. Upon brake actuating movement of brake pedal 46, plunger 50 is released and the dump valve 48 is opened. This admits atmospheric air to a conduit 78, as will be further described.

The portions of the system described to this point are known in the art and are believed to require no further description. Since the elements of the system are illustrated schematically, relative sizes do not reflect engineering requirements, such requirements being within the skill of the art. This applies, for example, to sizes of conduits, the servomotor 12, restrictions 36 and 40, for example.

The release valve assembly 54 which is the subject of the invention is schematically illustrated in cross section in the drawing. It includes a housing 56 which extends generally axially. The housing end 58 is provided with a movable wall 60. The other end 62 of the housing has a port 64 opening into a passage 66 which is placed in conduit 34 fluidly intermediate restriction 36 and servomotor chamber 18. A divider wall 68 is positioned in housing 56 intermediate housing ends 58 and 62, dividing the interior of housing 56 into a release chamber 70 and a vacuum chamber 72. Movable wall 60 forms one wall of release chamber 70 so that atmospheric pressure acts on the outer side of the movable wall and pressure in chamber 70 acts on the inner side thereof. Divider wall 68 has a passage 74 extending therethrough axially of housing 56 and providing fluid communication between chambers 70 and 72. A vent port 76 in housing 56 fluidly connects release chamber 70 to dump valve 48 through a conduit 78. Ports 80 and 82 are provided in housing 56 and open into vacuum chamber 72. Port 82 is connected with conduit 42 leading to intake manifold 32. Port 80 is connected by a conduit 84 to control valve 28. Conduit 84 is therefore effectively a continuation of conduit 42, with engine vacuum passing through chamber 72. A valve 86 is positioned in the end of vacuum chamber 72 so as to close port 64, which is otherwise fluid connected to chamber 72. A valve pin 88 is positioned in housing 56 so that it extends through passage 74 with its lower end 90 engaging valve 86 and its upper end 92 being positioned to be engaged by part of movable wall 60. A spring 94 in chamber 70 urges movable wall 60 upwardly away from valve pin end 92. However, as will be described, when the pressure in chamber 70 is sufficiently below atmospheric pressure, the pressure differential acting across movable wall 60 will move the wall to engage pin end 92. Passage 74 is somewhat larger in diameter than pin 88 so as to provide a restrictive fluid flow connection between chambers 70 and 72 when the pin is installed.

When the system is in the deactivated condition with the vehicle running and the brakes in the released condition, exhaust manifold pressure is restrictively provided through restriction 36 to conduit 34 and port 64. It is also restrictively provided to one side of control valve 28 through conduit 38 and restriction 40. Since control logic 26 is inactive and thus generating no signal for control valve 28, the control valve also provides the same pressure to pressure chamber 20, preventing any vacuum from conduit 84 from entering the servomotor at this point. Intake manifold pressure, which is vacuum, is found in conduits 42 and 84 and chamber 72. It is also provided in chamber 70 and conduit 78 through passage 74. Therefore movable wall 60 is held downwardly against valve pin end 92, holding valve pin 88 against valve 86 to maintain port 64 closed. The dump valve 48 is closed.

When the system is actuated to control road speed, logic 26 sends appropriate control signals to control valve 28. Control valve 28 generates a control pressure in conduit 44, utilizing exhaust manifold pressure provided it through conduit 38 and intake manifold vacuum provided it through conduit 84. The control pressure is transmitted through conduit 44 to servomotor chamber 20, creating a pressure differential across power wall 14 and moving servomotor output 22 in a direction to open the throttle valve 10 and controlling its movements as needed to maintain the desired vehicle speed.

When the brake pedal 46 is moved in the brake actuating direction under this condition, the dump valve 48 opens to admit atmospheric pressure into release chamber 70 through conduit 78 and vent port 76. This is a relatively unrestricted flow of atmospheric air. The lower pressure in chamber 72 is unable to maintain the evacuation of release chamber 70 through the restricted flow through passage 74. Therefore, after a very slight delay, spring 94 moves the movable wall 60 upwardly to release valve pin 88. The higher pressure from exhaust manifold 30 found in port 64 then forces valve 86 upwardly, connecting passage 66 with vacuum chamber 72. Since full intake manifold vacuum is provided in chamber 72, and restriction 36 allows only limited exhaust manifold pressure into passage 66 when there is fluid flow therethrough, the net effect will be the evacuation of passage 66 and the portion of conduit 34 between servomotor 12 and restriction 36 to substantially intake manifold pressure. Thus chamber 18 of the servomotor will also be evacuated. Meanwhile, logic 26 will no longer generate its signal to control valve 28 due to electrical interruption of the signal by a suitable switch, not shown, also opened by brake pedal movement, as is well known in the art. Therefore conduit 44 will be closed to vacuum from conduit 84 and any higher pressure momentarily remaining at the control valve 28 will be transmitted to chamber 20. The evacuation of chamber 18 of the servomotor will take place at a higher rate, due to the function of restriction 40, than will evacuation of chamber 20 through conduit 44, control valve 28, and conduit 38. This therefore generates a short duration pressure differential across power wall 14 moving servomotor output 22 in the throttle closing direction.

Upon release of the brake pedal 46, dump valve 48 is closed. Evacuation of chamber 70 is accomplished through passage 74. When the pressure differential across movable wall 60 is sufficient, the wall moves against the force of spring 94 to move valve pin 88 and therefore valve 86 so that the valve again closes port 64. With this port closed, the higher pressure from the exhaust manifold passing through the restriction 36 can again be established in passage 66, port 64, all of conduit 34, conduit 38, and servomotor chamber 18. The control valve 28 will again receive signals from logic 26 if the logic has been reactivated, and will again act to control the operation of servomotor 12. If control valve 28 is not receiving such signals because the operator has not again actuated logic 26 to operate the system in the road speed controlling mode, the exhaust manifold pressure will be provided in chamber 20 as before so that power wall 14 is substantially pressure balanced and has no opening effect on throttle valve 10.

The closing force on valve 86 is determined by the ratio of the effective area of movable wall 60 to the area of port 64. Since the movable wall 60 has a much larger effective area than port 64, a slight vacuum on the order of 1" to 2" of Hg can keep valve 86 closed against a much greater pressure found in passage 66.

The higher fluid pressure on the valve 86 is in the direction tending to release the cruise control system. Therefore any condition which may occur resulting in loss of vacuum will act to release the cruise control system by permitting valve 86 to open port 64.

What is claimed is:

1. A differential pressure actuated release valve assembly for activating and releasing a differential pressure operated servomotor, said valve assembly comprising:

a housing having a first chamber adapted to be continuously connected to a subatmospheric pressure source and to be operatively connected to communicate said subatmospheric pressure to said servomotor;

said housing having a second chamber having a bleed connection to said first chamber permitting restricted fluid flow therebetween, a normally closed vent port adapted to be opened to atmosphere under a condition requiring release of said servomotor, and a movable wall biased to expand the volume of said second chamber with one side of said movable wall adapted to be subjected to atmospheric pressure and the other side subjected to pressure in said second chamber;

said housing having a second port having a valve therein for opening and closing thereof and adapted through a restriction to be restrictively connected on one valve side to a source of superatmospheric pressure and operatively connected to communicate said superatmospheric pressure to said servomotor, said second port being connected on the other valve side to said first chamber to selectively prevent communication of said subatmospheric pressure with said servomotor through said second port when said second port is closed by said valve, thereby to permit communication of both subatmospheric and superatmospheric pressures with said servomotor to activate said servomotor;

and valve operating means actuated by said movable wall to hold said valve to close said second port while said second chamber is at said subatmospheric pressure as the result of said bleed connection with said first chamber and to permit said valve to open said second port in response to said superatmospheric pressure on said one valve side when said second chamber is vented to atmosphere, said restriction and the opening of said valve serving to place only subatmospheric pressure in communication with said servomotor, thereby to release said servomotor.

2. In a vehicle road speed control system having a differential pressure operated servomotor and control means for controlling the vehicle engine to control vehicle road speed, first and second sources of pressure at different pressure levels, said first source being vehicle engine vacuum, and means operatively responsive to vehicle brake actuation to inactivate said system, said last named means including a differential pressure operated release valve comprising:

a housing having a vacuum chamber and a release chamber provided therein, and a first wall separating said chambers and having passage means therethrough;

first, second and third ports in said housing opening into said vacuum chamber, said first port being substantially unrestrictedly connected to said first pressure source, said second port being substantially unrestrictedly connected to said control means, said third port being restrictively connected to said second pressure source and connected to said control means;

a fourth port in said housing opening into said release chamber and being closed when the vehicle brakes are released and being opened to atmosphere when the vehicle brakes are actuated;

a differential pressure responsive movable second wall defining one wall of said release chamber opposite said first wall and having the one side thereof opposite said release chamber exposed to atmosphere, and spring means urging said second wall away from said first wall;

a valve in said vacuum chamber operable to open and close said third port;

and a movable valve pin extending through said first wall passage means with one end engaging said valve and the other end engageable with said second wall, said passage means permitting restrictive flow therethrough between said vacuum and release chambers;

whereby with said fourth port closed said release chamber is at the same pressure as said vacuum chamber and said second wall acts against said spring means and on said valve pin to hold said valve in a position closing said third port, and upon brake actuation said fourth port is opened to atmosphere so that said release chamber is vented to atmosphere, decreasing the pressure differential acting across said second wall so that said second wall is moved by said spring means to release said valve pin to permit said valve to open said third port, thereby imposing pressure from said first source through said second and third ports to cause only pressure from said first source to be delivered to said control means and to said servomotor, deactivating the system.

* * * * *